(12) United States Patent
Liu et al.

(10) Patent No.: US 7,448,030 B2
(45) Date of Patent: Nov. 4, 2008

(54) OPTIMIZED ORDERING OF FIRMWARE MODULES IN PRE-BOOT ENVIRONMENT

(75) Inventors: Yan Liu, Shanghai (CN); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 10/804,405

(22) Filed: Mar. 18, 2004

(65) Prior Publication Data

US 2005/0210222 A1 Sep. 22, 2005

(51) Int. Cl.
G06F 9/45 (2006.01)
(52) U.S. Cl. .................................. 717/157; 714/38
(58) Field of Classification Search ......... 717/157–159, 717/133, 134, 144, 151, 156, 132, 153, 140; 714/38, 36
See application file for complete search history.

(56) References Cited

U.S. PATENT DOCUMENTS

| | | | | | |
|---|---|---|---|---|---|
| 5,297,150 | A | * | 3/1994 | Clark | 714/26 |
| 5,850,552 | A | * | 12/1998 | Odani et al. | 717/156 |
| 5,873,081 | A | * | 2/1999 | Harel | 707/3 |
| 5,887,174 | A | * | 3/1999 | Simons et al. | 717/161 |
| 5,970,496 | A | * | 10/1999 | Katzenberger | 707/102 |
| 5,978,588 | A | * | 11/1999 | Wallace | 717/159 |
| 6,139,199 | A | * | 10/2000 | Rodriguez | 717/159 |
| 6,343,376 | B1 | * | 1/2002 | Saxe et al. | 717/154 |
| 6,654,952 | B1 | * | 11/2003 | Nair et al. | 717/157 |
| 6,848,086 | B2 | * | 1/2005 | Teig et al. | 716/3 |
| 6,854,097 | B2 | * | 2/2005 | Teig et al. | 716/3 |
| 6,854,098 | B2 | * | 2/2005 | Teig et al. | 716/3 |
| 6,857,117 | B2 | * | 2/2005 | Teig et al. | 716/18 |
| 6,954,910 | B2 | * | 10/2005 | Teig et al. | 716/3 |
| 6,965,989 | B1 | * | 11/2005 | Strange et al. | 713/1 |
| 6,971,092 | B1 | * | 11/2005 | Chilimbi | 717/158 |
| 6,990,650 | B2 | * | 1/2006 | Teig et al. | 716/12 |
| 7,024,639 | B2 | * | 4/2006 | Teig et al. | 716/3 |
| 7,076,760 | B2 | * | 7/2006 | Teig et al. | 716/12 |
| 7,100,143 | B2 | * | 8/2006 | Teig et al. | 716/18 |

(Continued)

OTHER PUBLICATIONS

IDE Tools from (micro) Vendors Speed Embedded-Application Development, Nath, Manju, Aug. 17, 2000, p. 2 pages.*

(Continued)

*Primary Examiner*—Todd Ingberg
(74) *Attorney, Agent, or Firm*—Blakely, Sokoloff, Taylor & Zafman LLP

(57) ABSTRACT

A method and system to optimize ordering of firmware modules. Optimizing the dispatch order of firmware modules reduces the boot time of a computer system. A plurality of module-to-module interfaces are collected from a plurality of firmware modules, wherein a module-to-module interface allows a first firmware module of the plurality of firmware modules to invoke a second firmware module of the plurality of firmware modules. A plurality of dependency expressions corresponding to the plurality of firmware modules are collected, wherein each dependency expression of a firmware module describes the module-to-module interfaces needed for execution of the firmware module. The plurality of firmware modules are sorted into an optimized order based on the plurality of dependency expressions and the plurality of module-to-module interfaces. In one embodiment, the plurality of firmware modules operate in accordance with an Extensible Firmware Interface (EFI) specification.

27 Claims, 11 Drawing Sheets

U.S. PATENT DOCUMENTS 7,165,170 B2 * 1/2007 Rothman et al. ............... 713/1

OTHER PUBLICATIONS

"Progress In High-Level Microprocessing", Scott Davidson, IEEE Software, 1986, 1 page.*
"Real-Time Software—Software Supports Win32", Terry Costlow, Electronic Engineering Times, Jul. 28, 1997, 1 page.*
"Global Compaction of Horizontal Microprograms Based on the Generalized Data Dependency Graph", Sadahiro Isoda et 1983, pp. 922-933.*
"Optimally Profiling and Tracing Programs", Thomas Ball and James R. Larus, Sep. 6, 1991 Revised Jan. 22, 1992, pp. 1319-1360.*
"On Exploiting Declarative Programming and Parallel Execution in Computer Base Systems", B Lennartsson, et al, IEEE, p. 131-137, May 1994.*
Extensible Firmware Interface, Wikipedia, 7 pages http://en.wikipedia.org/wiki/Extensible_Firmware_Interface.*
HP OpenView, A Guide to Hewlett-Packard's Network and System Management Platform, Nathan Muller, 1995, p. 256.*
Compilers Principles, Techniques and Tools, Alfred V. Aho et al, Sep. 12, 1985, pp. 1-12, 83-146, 159-266, 279-3, 343-380, 389-454, 463-508, 513-580, 585-711, 780-796.*

* cited by examiner

OPTIMIZED ORDERING OF FIRMWARE MODULES IN PRE-BOOT ENVIRONMENT

BACKGROUND

1. Field of Invention

The field of invention relates generally to computer systems and, more specifically but not exclusively, relates to optimized ordering of firmware modules.

2. Background Information

In a typical computer architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of pre-boot, it is up to the code in the firmware to initialize the system to the point that an operating system can take over. The start of the OS load begins the period commonly referred to as OS runtime. During OS runtime, the firmware acts as an interface between software and hardware components of a computer system. As computer systems have become more sophisticated, the operational environment between the OS level and the hardware level is generally referred to as the firmware or the firmware environment.

Today, a computer system's BIOS is stored in a non-volatile storage device, such as a Read-Only Memory (ROM) chip. When the computer system boots, the code stored on the chip is loaded and executed as a single monolithic block. The next generation of computer system firmware utilizes firmware modules stored on the computer system. A firmware module includes a block of firmware code to support one or more hardware components of the computer system. Firmware utilizing firmware modules provides greater flexibility and versatility to system developers and coders.

However, employing firmware modules creates greater complexity in execution that increases the boot time of a computer system. For example, if a firmware module depends on the services of another firmware module, boot time is wasted as the computer system attempts to coordinate the execution of the code.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and system to optimize the ordering of firmware modules in a computer system are described herein. In the following description, numerous specific details are set forth, such as embodiments pertaining to the Extensible Firmware Interface (EFI) specification, to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention employ a firmware environment known as the Extensible Firmware Interface (EFI) (Extensible Firmware Interface Specification, Version 1.10, Dec. 1, 2002, available at http://developer.intel.com/technology/efi.) EFI is a public industry specification that describes an abstract programmatic interface between platform firmware and operating system or other application environments. EFI enables firmware, in the form of firmware modules, to be loaded from a variety of different resources, including flash memory devices, option ROMs (Read-Only Memory), various persistent storage devices (e.g., hard disks, CD-ROM (Compact Disk-Read Only Memory), etc.), or from one or more computer systems over a computer network.

Embodiments of the present invention are described in connection with the Intel@ Platform Innovation Framework for EFI Architecture Specification—Draft for Review, Version 0.9, Sep. 16, 2003 and hereinafter referred to as "the Framework." The Framework is but one embodiment of an implementation of the EFI specification for a firmware environment. Further, it will be understood that embodiments of the present invention are not limited to the Framework or implementations in compliance with the EFI Specification.

Figure 1:
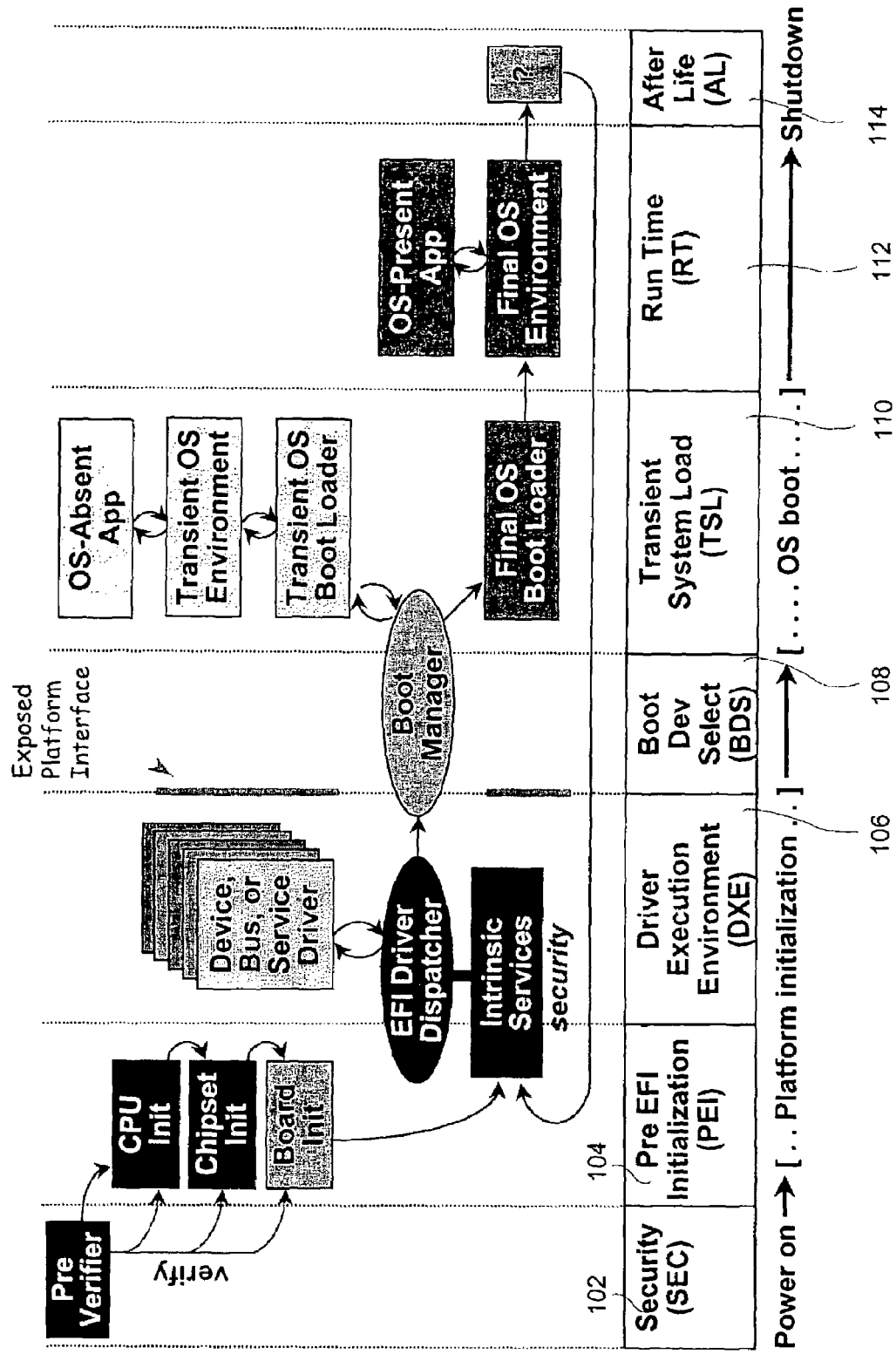
FIG. 1 is an event sequence diagram illustrating one embodiment of operations performed by a computer system in accordance with the teachings of the present invention.

FIG. 1 shows an event sequence diagram to illustrate an embodiment of operations performed by a computer system according to the Framework. The process is divided into several phases, including a Security (SEC) phase 102, a Pre-EFI Initialization (PEI) phase 104, a Driver Execution Environment (DXE) phase 106, a Boot Device Selection (BDS) phase 108, a Transient System Load (TSL) phase 110, an operating system Run-Time (RT) phase 112, and an After-Life (AL) phase 114. The phases build upon one another to provide an appropriate run-time environment for the OS and platform.

The SEC phase 102 supports security checks of the initial op-code to be executed on the computer system. The SEC phase 102 includes the power-on sequence of the computer system and authenticates the PEI Foundation (discussed below) before the PEI foundation is allowed to execute.

The PEI phase 104 provides a standardized method of loading and invoking specific initial configuration routines for the processor, chipset, and motherboard. The PEI phase is responsible for initializing enough of the system to provide a stable base for the follow on phases. Initialization of the platform's core components, including the processor, chipset and main board is performed during the PEI phase. The PEI phase discovers memory and prepares a resource map that is handed off to the DXE phase. The state of the system at the end of the PEI phase is passed to the DXE phase through a list of position independent data structures called Hand Off Blocks (HOBs). The PEI phase 104 will be discussed further below.

The DXE phase 116 is the phase during which most of the system initialization is performed. The DXE phase 116 is facilitated by several components, including the DXE Core, the DXE Dispatcher, and a set of DXE drivers. The DXE Core produces a set of Boot Services, Runtime Services, and DXE Services. The DXE Dispatcher is responsible for discovering and executing DXE drivers in the correct order. The DXE drivers are responsible for initializing the processor, chipset, and platform components as well as providing software abstractions for console and boot devices. These components work together to initialize the platform and provide the services required to boot an operating system.

The BDS phase 108 further prepares the computer system to load an operating system. The TSL phase 110 allows services to be available to an OS loader before the OS is allowed to take control of the computer system. At the RT phase 112, the firmware turns over control of some hardware to the operating system. EFI Runtime services survive into the RT phase 112. In the AL phase 114, the firmware may continue to function after the OS has terminated.

Figure 2:
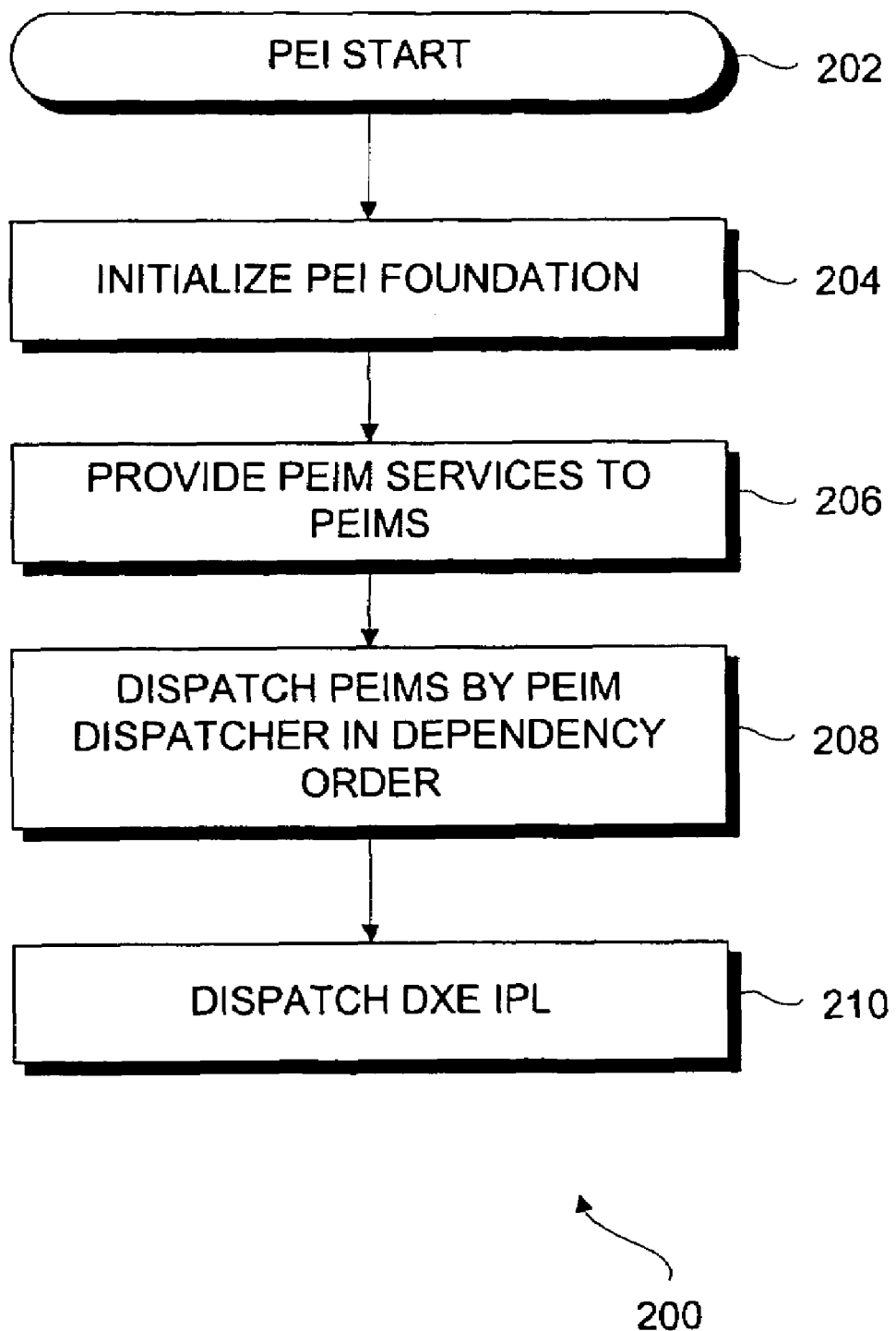
FIG. 2 is a flowchart illustrating one embodiment of the logic and operations of a pre-boot phase of a computer system in accordance with the teachings of the present invention.
Figure 3A:
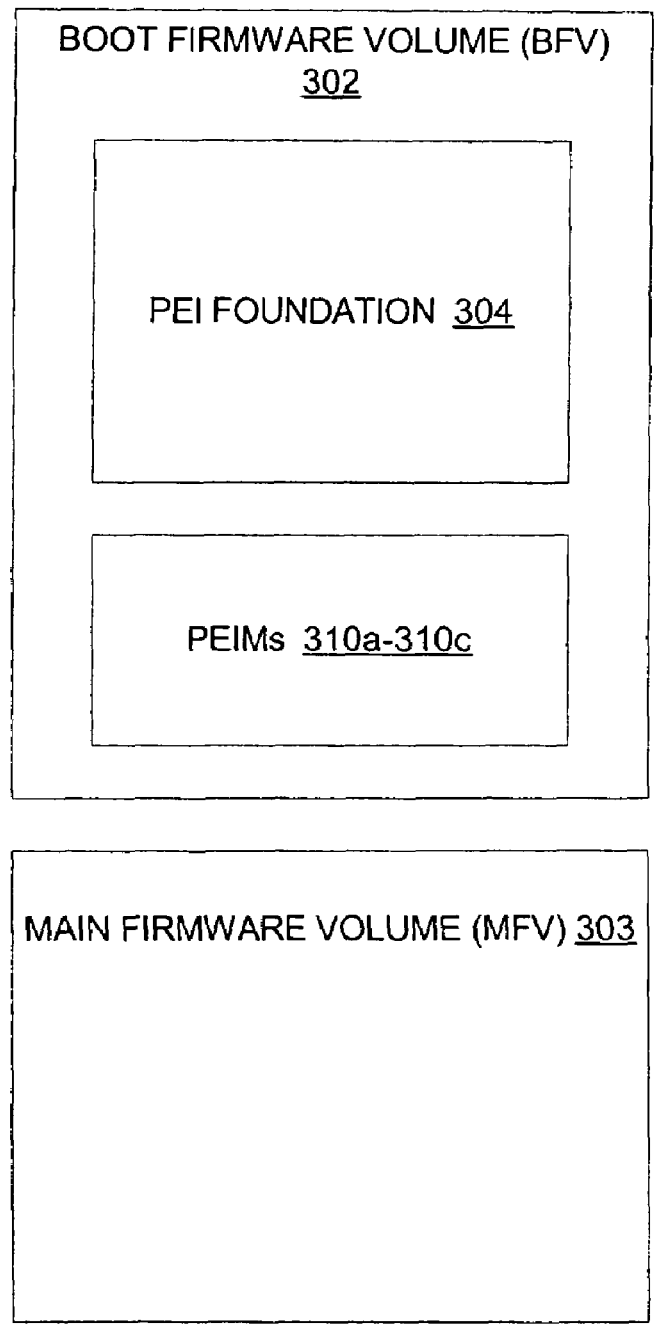
FIG. 3A is a block diagram illustrating one embodiment of a pre-boot environment of a computer system in accordance with the teachings of the present invention.

Details of the PEI phase 104 to employ an embodiment of the present invention will be discussed in conjunction with FIGS. 2-4. FIG. 2 is a flowchart illustrating one embodiment of the logic and operations during the PEI phase of the Framework. Beginning in a block 202, the PEI phase is started. Code to support the PEI phase is stored in a Boot Firmware Volume (BFV) 302 of a computer system 300, referring to FIG. 3A. The BFV 302 contains code that appears in the memory address space of the system without prior firmware intervention. The computer system 300 also includes Main Firmware Volume (MFV) 303 that includes various modules, drivers, and data to support the firmware of the computer system. In other embodiments, the computer system 300 may include one or more firmware volumes. In one embodiment, the BFV 302 and MFV 303 are stored in a non-volatile storage device of the computer system 300, such as flash memory.

Figure 3B:
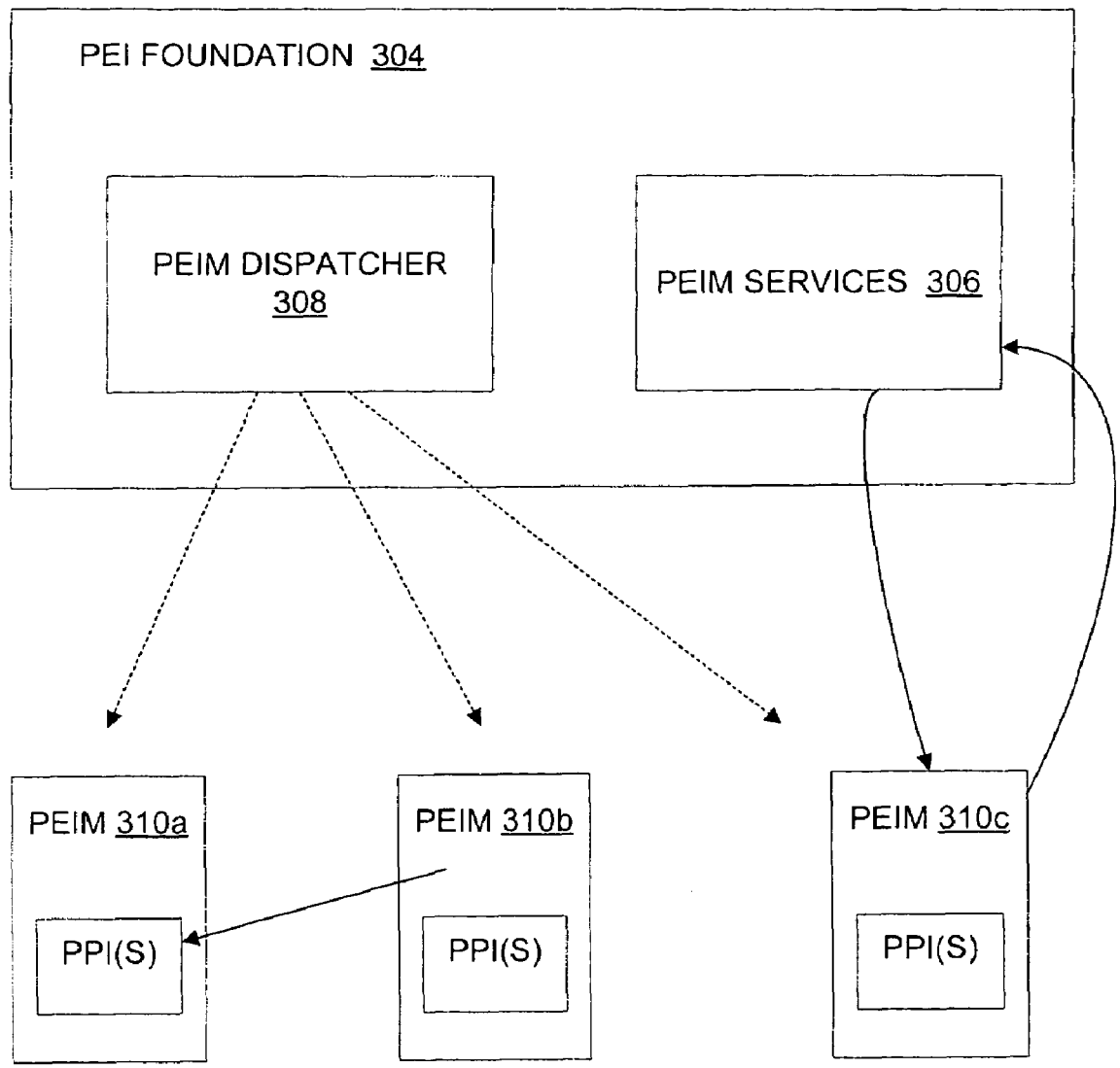
FIG. 3B is a block diagram illustrating one embodiment of a pre-boot environment of a computer system in accordance with the teachings of the present invention.

Continuing in flowchart 200, the PEI Foundation 304 is initialized, as depicted in a block 204. Referring to FIG. 3B, the PEI Foundation 304 provides for the dispatching of PEIMs (Pre-EFI Initialization Modules) 310a-310c by a PEIM Dispatcher 308 and provides a set of PEIM services 306 for use by the PEIMs 310a-310c. It will be understood that a PEIM constitutes one embodiment of a firmware module.

Continuing to a block 206, the PEIM services 306 are provided to PEIMs 310a-310c. The PEI Foundation 304 generates a PEI Services Table that is accessible by all PEIMs in the computer system. Example services may include assisting in communication between PEIMs, managing temporary Random Access Memory (RAM) for use by PEI components, and preparing for the transition from the PEI phase to the DXE phase. In FIG. 3B, PEIM 310c has requested and received a PEIM service from PEIM Services 306.

Proceeding to a block 208, the PEIM Dispatcher 308 dispatches PEIMs 310a, 310b, and 310c in their dependency order. The PEIM Dispatcher 308 examines the dependency expression of each PEIM to determine if the PEIM can execute. If the dependency expression of a PEIM cannot be satisfied, then execution of the PEIM will be deferred until later (discussed further below in conjunction with FIGS. 5A and 5B.) In FIG. 3B, PEIMs 310a, 310b, and 310c have been dispatched by PEIM Dispatcher 308.

Figure 4:
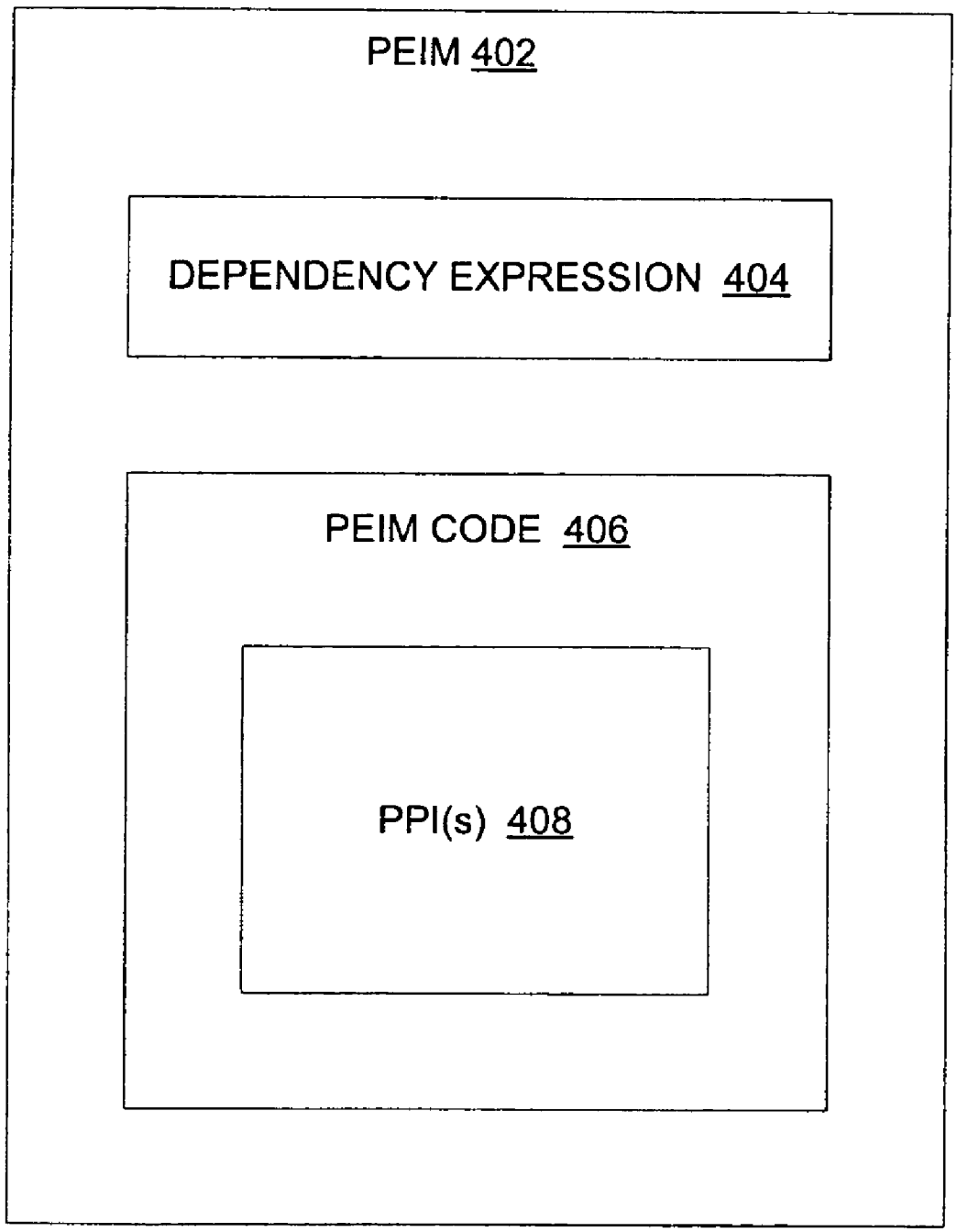
FIG. 4 is a block diagram illustrating one embodiment of a firmware module in accordance with the teachings of the present invention.

Referring to FIG. 4, an embodiment of a PEIM 402 is illustrated. PEIM 402 includes a Dependency Expression 404 and PEIM code 406. A PEIM includes machine-executable code to provide functionality to platform devices such as, but not limited to, a processor, a chipset, or the like.

A firmware module may also provide a module-to-module interface that allows other firmware modules to communicate with the firmware module or the hardware the firmware module abstracts. In the Framework, these interfaces are referred to as PEIM-to-PEIM Interfaces (PPIs). In FIG. 4, PEIM 402 generates PPIs 408.

When a PEIM executes, the PPIs of the PEIM are registered with the PEI Foundation 304 that manages a database of PPIs. When a PEIM wishes to use a specific PPI, the PEIM asks the PEI Foundation 304 for the location to the PPI. It will be understood that a PEIM may not necessarily generate a PPI. Referring to FIG. 3B, PEIM 310b is accessing a PPI of PEIM 310a.

Dependency Expression 404 describes the conditions that must be satisfied before the PEIM 402 may be executed. In one embodiment, the Dependency Expression 404 describes the PPIs that must be registered with the PEIM Foundation 304 before the PEIM may be run. In one embodiment, the GUIDs (Globally Unique Identifiers) of PPIs are described in the Dependency Expression 404. It will be understood that a PEIM may not necessarily have a PPI dependency, thus, the Dependency Expression of such a PEIM would be null.

Returning to FIG. 2, in block 208, the PEI Foundation 304 confirms that it has dispatched all of the PEIMs. The logic then proceeds to a block 210 to dispatch the DXE phase Initial Program Loader to begin the DXE phase of the computer system boot.

Thus, for each PEIM, a PEIM may need one or more PPIs to be available before the PEIM may execute. Additionally, a PEIM may generate one or more PPIs. However, it is not required that a PEIM have a dependency or produce a PPI. Embodiments of the present invention optimize the order the firmware modules are executed in based on dependency expressions and module-to-module interfaces to minimize the overall time to boot the computer system. In one embodiment (discussed below), the ordering of PEIMs may be conducted when the firmware volume is constructed by a firmware volume build tool.

Figure 5A:
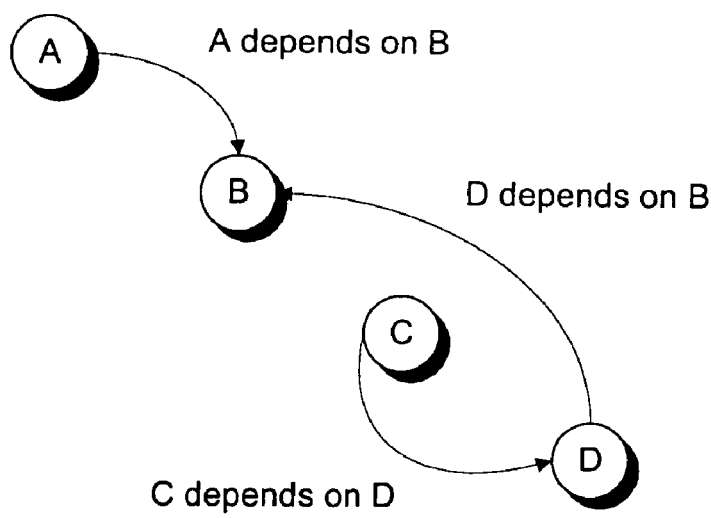
FIG. 5A is a block diagram illustrating one embodiment of the dispatch of firmware modules of a computer system in accordance with the teachings of the present invention.
Figure 5B:
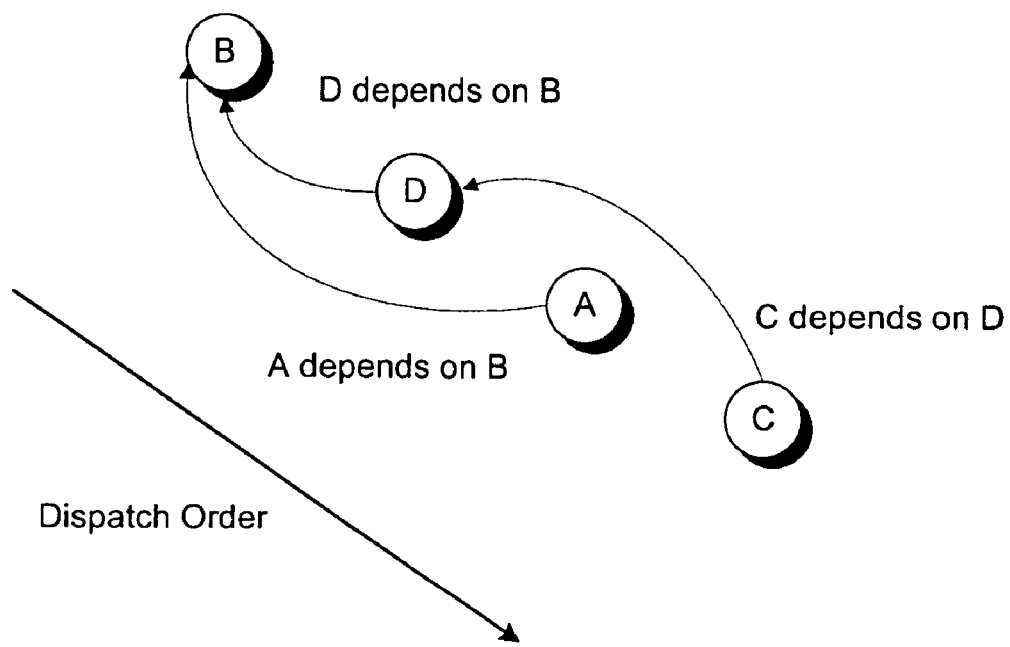
FIG. 5B is a block diagram illustrating one embodiment of the dispatch of firmware modules of a computer system in accordance with the teachings of the present invention.

Referring to FIGS. 5A and 5B, an embodiment of the present invention to optimize the ordering of firmware modules is shown. FIG. 5A is a simple example of firmware module dispatching using firmware modules A, B, C and D. As shown in FIG. 5A, A depends on B, C depends on D, and D depends on B. The following dispatching may occur if the firmware modules have been ordered as A, B, C and D for execution.

Round 1:
Attempt to execute A. Defer A because A depends on B.
Attempt to execute B. Execute B because B has no dependencies.
Attempt to execute C. Defer because C depends on D.
Attempt to execute D. Execute D because B has executed prior.

Round 2:
Attempt to execute A. Execute A because B has executed prior.
Attempt to execute C. Execute C because D has executed prior.

As can been seen in the example of FIG. 5A, the ordering of the firmware modules may result in the (i-1) module depending upon the $i^{th}$ module, i=1 . . . (N-1) where N is the number of firmware modules. The temporal complexity of this random ordered dispatching is $O(N^2)$.

As shown by the embodiment of FIG. 5B, system performance can be improved by optimizing the execution order of the firmware modules. At the build of the firmware volume, the firmware modules can be sorted in an optimal order to eliminate multiple cycling through the firmware modules. This optimized ordering lessens the boot time of a computer system.

In one embodiment, the firmware modules are ordered according to a directed acyclic graph (DAG). A DAG is generally defined as a directed graph containing no cycles.

In FIG. 5B, the firmware modules A, B, C and D are re-ordered according to a DAG of their dependencies. The optimized order of execution is shown as B, D, A, C. Thus, dispatching may execute as follows:

Attempt to execute B. Execute B because B has no dependencies.
Attempt to execute D. Execute D because B has executed prior.
Attempt to execute A. Execute A because B has executed prior.
Attempt to execute C. Execute C because D has executed prior.

When the FV is executed during pre-boot, the boot time is reduced because the firmware modules have been ordered so that dispatching of the firmware modules may occur without cycling. Without the optimized ordering, the firmware modules are repeatedly cycled through until there are no more firmware modules to dispatch. Embodiments of optimized ordering, as described herein, eliminate the cycling and thus reduce the boot time of a computer system.

Testing of embodiments of the present invention have yielded the following results as shown in Table 1. Tests were performed on a 32-bit Intel Architecture (IA-32) platform. The platform was configured with an Intel 2.4 Gigahertz Central Processing Unit (CPU), Intel 865 Memory Controller Hub (MCH), Intel Input/output Controller Hub (ICH) 5 and 256 Megabytes of Double Data Rate (DDR) system memory.

Table 1 also shows the times for the test platform to resume from S3. The S3 sleep state is a system sleep mode described in the Advanced Configuration and Power Interface (ACPI) Specification, Revision 2.0b, Oct. 11, 2002 Under the Framework, a modified PEI phase is conducted before the computer system can wake from S3.

TABLE 1

|  | Random Order 1 | Random Order 2 | Optimized Order |
| --- | --- | --- | --- |
| PEI phase speed (milliseconds) | 1961 | 1811 | 1509 |
| S3 resume speed (milliseconds) | 994 | 857 | 583 |

It will be understood that mistakes in the order of the firmware modules may not cause a system error. The firmware may cycle through the firmware modules instead of proceeding directly through the firmware modules in order. While an ordering error may result in increased PEI time because of the cycling, the platform will most likely not suffer a system error.

In a multi-processor system, all processors may try to access the same firmware volume because each processor will execute a PEI phase. In one embodiment, the multi-processor system includes at least two processors from the Intel Itanium® family of processors. In another embodiment, the multiple processors access the same FV code stored in a ROM where code may be fetched 8-bits at a time.

In a multi-processor system, a processor may have to wait behind other processors to gain access to the FV. Such delays may cause synchronization conflicts between processors. For example, the bootstrap processor selection (BSP) waits for the processors to check-in to report their status. If a processor is delayed because it must wait to complete the PEI phase, then the processor may check-in late. If a processor does not check-in timely, then the BSP may think a processor is malfunctioning or non-existent. By optimizing the order of the PEIMs as described herein, the execution time of the PEI phases will be reduced and thus reduce boot delays and synchronization problems in a multi-processor system.

Figure 6:
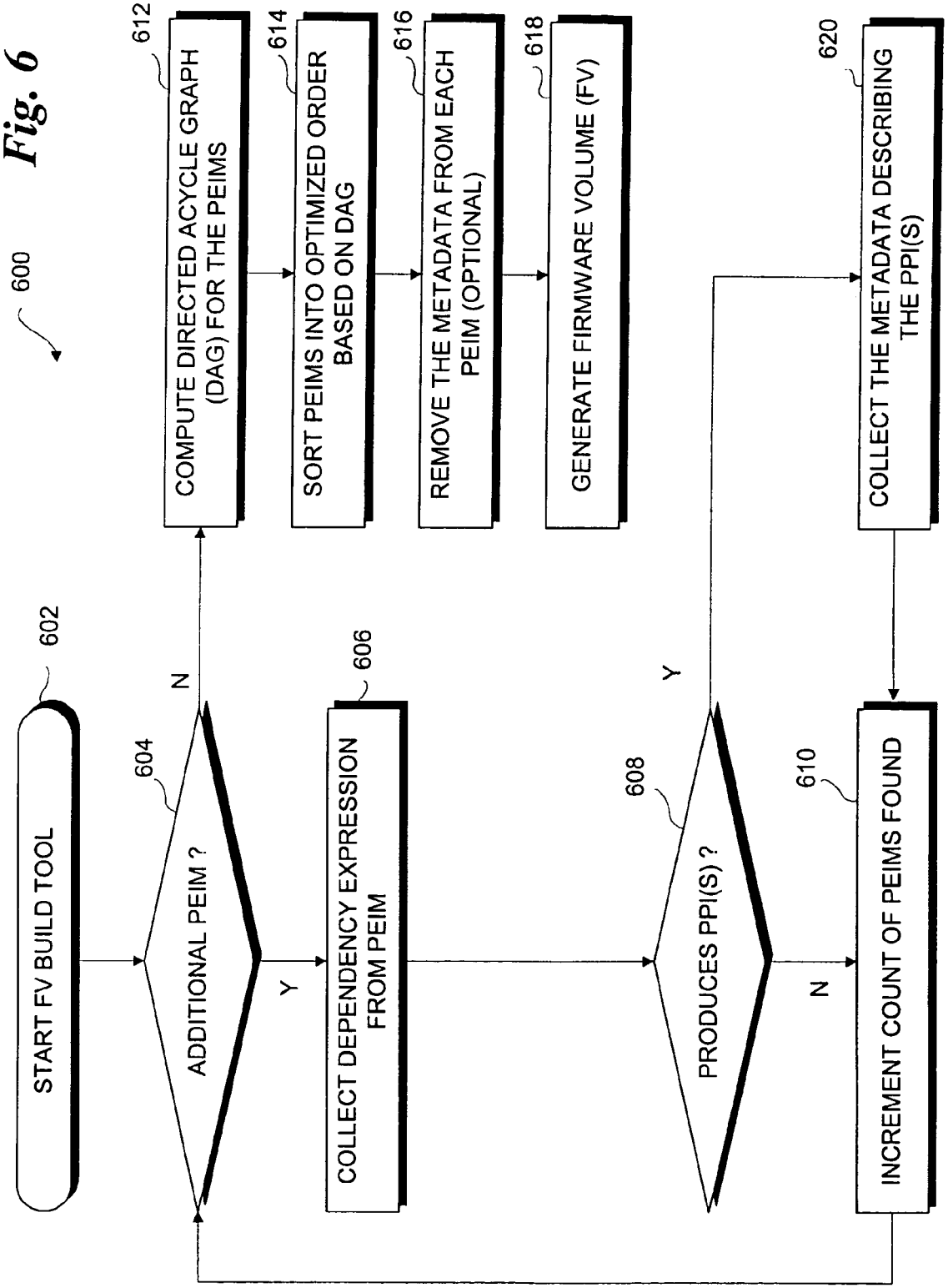
FIG. 6 is a flowchart illustrating one embodiment of the logic and operations to optimize the ordering of firmware modules in accordance with the teachings of the present invention.

Referring to FIG. 6, a flowchart 600 illustrating one embodiment of the logic and operations to optimize the ordering of firmware modules by a firmware volume (FV) build tool is shown. FIG. 6 illustrates an embodiment in accordance with the Framework. Beginning in a block 602, a firmware volume build tool is started. In one embodiment, the FV build tool is a Microsoft Windows® application.

Proceeding to a decision block 604, the logic determines if there are any more PEIMs to process. If the answer is no, then the logic proceeds to a block 612 to begin computing the optimized order of the PEIMs (discussed further below.)

If the answer to decision block 604 is yes, then the logic proceeds to a block 606. In block 606, the build tool collects dependency expressions for the PEIM.

Figure 7:
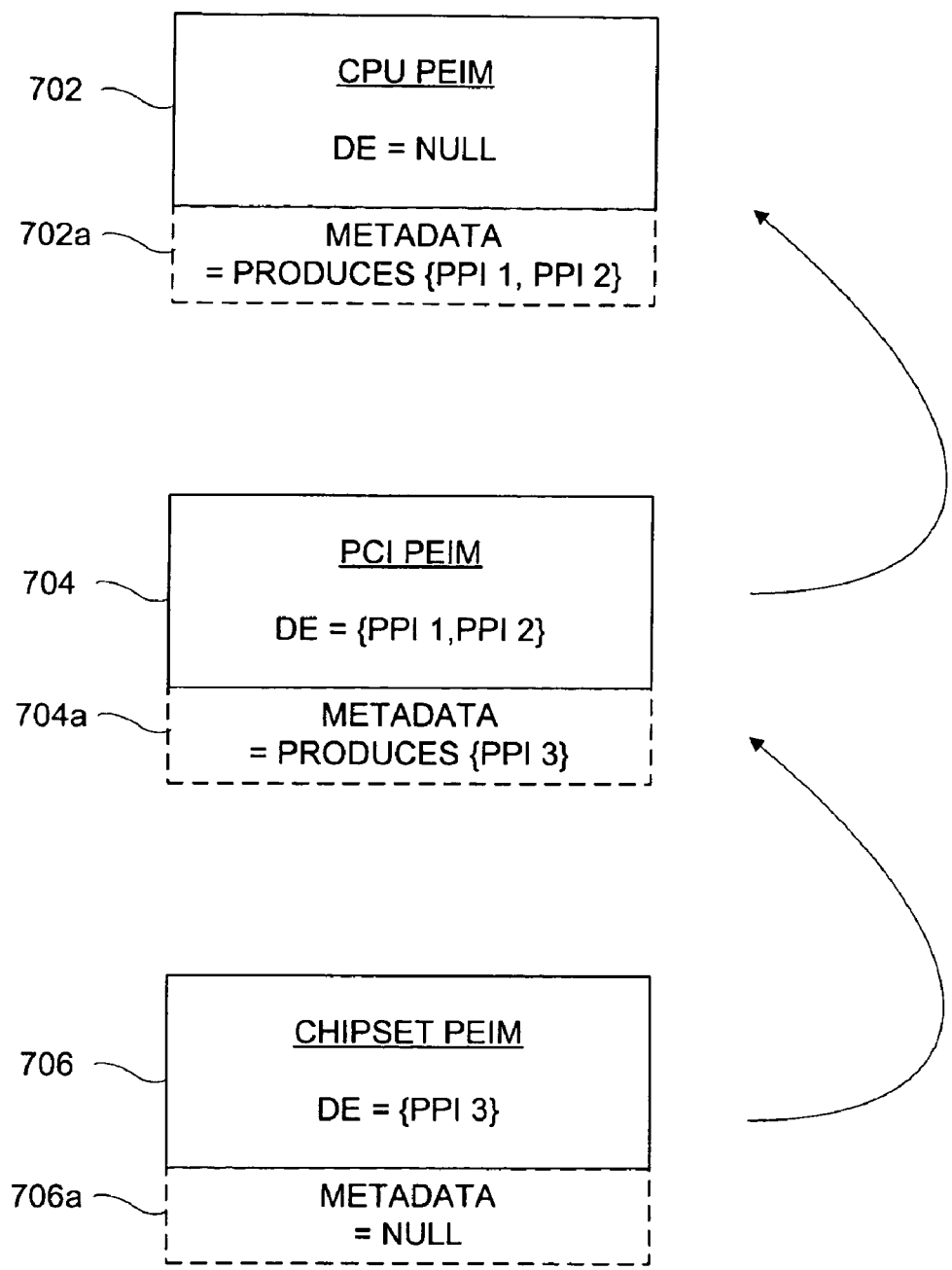
FIG. 7 is a block diagram illustrating one embodiment to optimize the ordering of firmware modules in accordance with the teachings of the present invention.

Referring to FIG. 7, a CPU PEIM 702, a Peripheral Component Interconnect (PCI) PEIM 704, and a Chipset PEIM 706 are shown. CPU PEIM 702 has a null dependency expression. PCI PEIM 704 has a dependency expression of PPI 1 and PPI 2. Chipset PEIM 706 depends on PPI 3 based on its dependency expression. In one embodiment, the PPIs are identified by GUIDs.

Continuing to a decision block 608, the logic determines if the PEIM produces any PPIs. If the answer to decision block 608 is no, then the logic proceeds to a block 610 to increment the count of the number of PEIMs found. The count of PEIMs may be used by the FV build tool to determine if all PEIMs have been processed before proceeding to optimize the PEIM order.

If the answer to decision block 608 is yes, then the logic proceeds to a block 620 to collect the metadata associated with the PEIM that describes the PPI(s). Each PEIM has associated metadata that assists the FV build tool in determining what PPIs a particular PEIM will generate. This information will be used by the FV build tool in developing the optimized ordering.

In FIG. 7, CPU PEIM metadata 702a shows that PEIM 702 produces PPI 1 and PPI 2. PCI PEIM metadata 704a of PEIM 704 indicates that production of PPI 3. Chipset PEIM metadata 706a shows that PEIM 706 produces no PPIs.

It will be appreciated that the developer of the PEIM may generate and associate the metadata with a particular PEIM. For example, in one embodiment, the hardware developer creates a new CPU. The hardware developer also creates a PEIM to be used with the new CPU on platforms employing the Framework for EFI. The developer may also attach the metadata to the PEIM at this time.

Referring again to FIG. 6, after the FV build tool collects the metadata information for the PEIM in a block 620, the logic proceeds to block 610 to increment the count of PEIMs found.

The logic then proceeds back to decision block 604. If the answer to decision block 604 is yes, then the logic proceeds to a block 612 to compute the DAG for the PEIMs. The DAG is based on the dependency expressions and the metadata of the PEIMs. Continuing to a block 614, the PEIMs are sorted into an optimized order based on the DAG.

In a block 616 of FIG. 6, the metadata is removed from each PEIM. Removing the metadata is optional and may be done to reduce file size when the PEIMs are collected into a firmware volume. Referring again to FIG. 7, the PEIMs 702, 704, and 706 are placed in optimized order. The metadata 702a, 704a, and 706a are surrounded by a dotted line to indicate that the metadata maybe "torn away" before the PEIMs are integrated into a FV file.

Continuing to a block 618 in FIG. 6, the sorted PEIMs are included in a firmware volume file generated by the FV build tool. In one embodiment, the firmware volume is a binary file (.bin).

Figure 8:
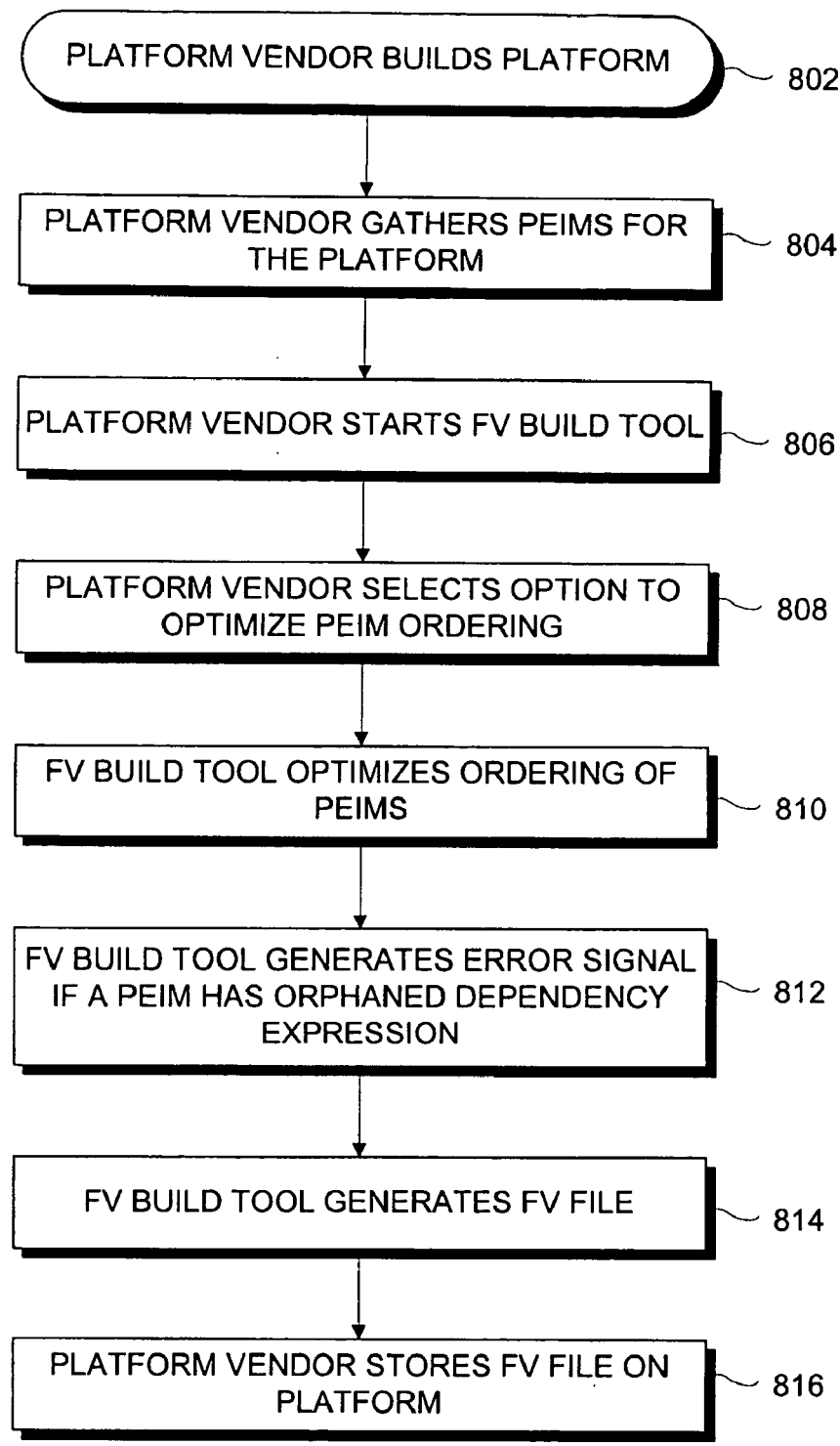
FIG. 8 is a flowchart illustrating one embodiment of the logic and operations to optimize the ordering of firmware modules in accordance with the teachings of the present invention.

Referring to FIG. 8, a flowchart 800 shows one embodiment of the logic and operations to build a firmware volume having firmware modules in optimized order. Starting in a block 802, a platform vendor builds a platform. Continuing in a block 804, the platform vendor gathers together the PEIMs for the components of the platform. In a block 806, the platform vendor starts a FV build tool for constructing a firmware volume for the platform. In a block 808, the platform vendor selects an option in the FV build tool to optimize the ordering of the PEIMs. The FV build tool optimizes the ordering of the PEIMs in accordance with embodiments described herein, as depicted in a block 810.

Continuing to a block 812, the FV build tool may generate an error signal if a PEIM has an orphaned dependency expression. An orphaned dependency expression occurs when the dependency expression refers to a PPI that is not generated by any of the PEIMs. Thus, the orphaned dependency expression of the PEIM cannot be satisfied. Subsequently, that PEIM cannot be properly executed. In one embodiment, the PEIM with the orphaned dependency is not built into the FV, thus reducing the size of the FV. This saves flash memory space that would otherwise be wasted on a PEIM that could not be properly executed due to the orphaned dependency expression.

The logic proceeds to a block 814 to generate a FV file. In block 816, the FV file is stored on the platform. In one embodiment, the FV file is stored in non-violate storage, such as flash memory, of the platform.

Figure 9:
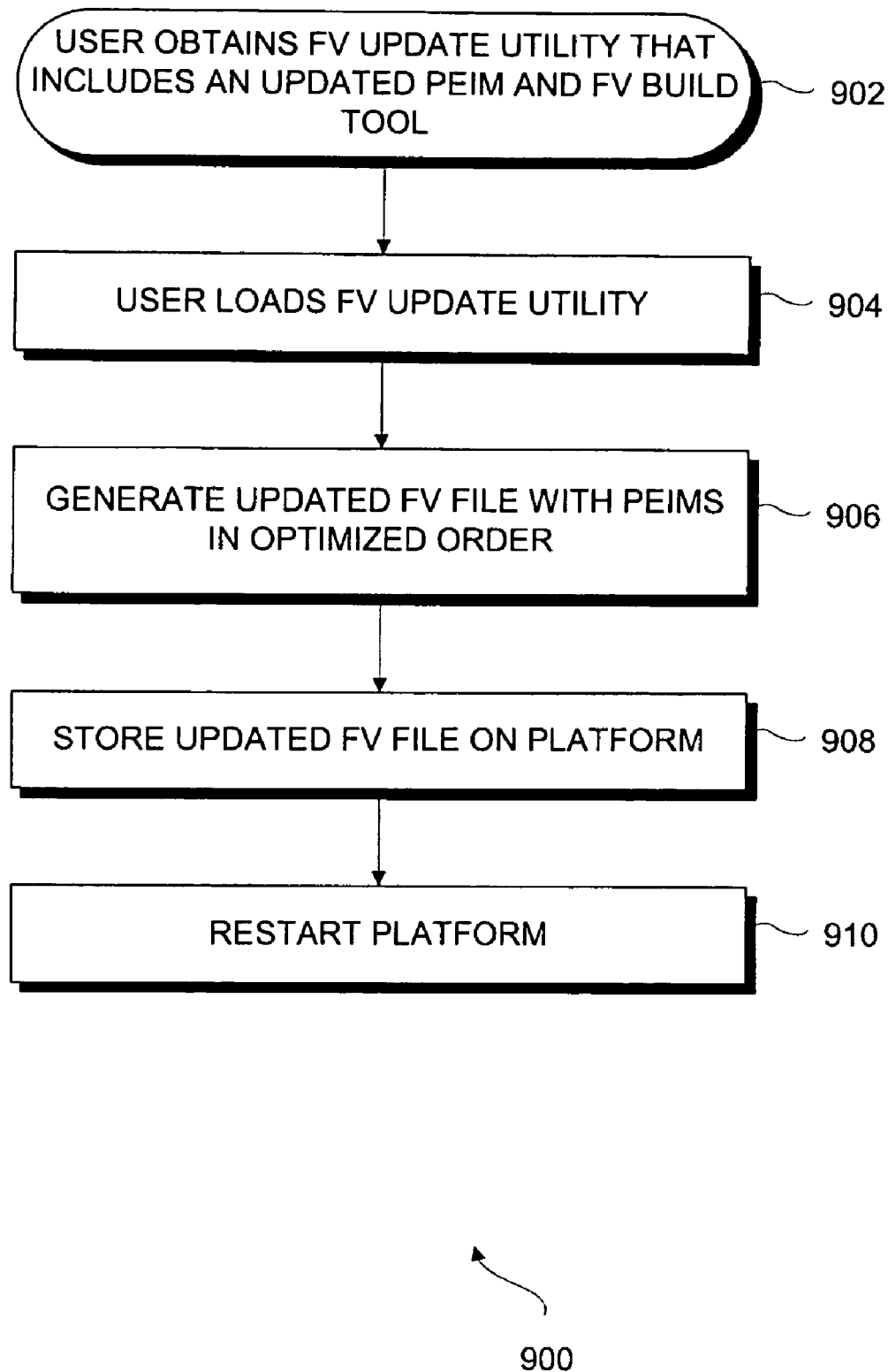
FIG. 9 is a flowchart illustrating one embodiment of the logic and operations to optimize the ordering of firmware modules in accordance with the teachings of the present invention.

Referring to FIG. 9, flowchart 900 shows one embodiment of the logic and operations to update a FV file in the field with an updated PEIM. In an alternative embodiment to flowchart 900, the user may remove a PEIM and then re-order the PEIMs; in another embodiment, the user may add a new PEIM and then re-order the PEIMs. In yet another embodiment, the user includes a system administrator modifying one or more PEIMs of a firmware volume of a network server.

Starting in a block 902, the user obtains a FV update utility that includes an updated PEIM and a FV build tool. In one embodiment, the FV update utility includes a capsule_update.efi file that includes a FV build tool and a payload.bin file that includes the updated PEIM. In one embodiment, the user downloads the update utility from a web site over the Internet; in another embodiment, the user obtains the update from a storage device, such as an optical disk.

Continuing to a block 904, the user loads the FV update utility onto a platform. In one embodiment, the update utility is loaded onto the platform to be updated; in another embodiment, the update utility is loaded on a first platform to update the FV of another platform over a network.

In a block 906, an updated FV file is generated using the update utility with the PEIMs in an optimized order. Proceeding to a block 908, the updated FV file is stored on the platform. In one embodiment, the FV file is stored in non-violate storage, such as flash memory, of the platform. In a block 910, the computer system is restarted with the updated FV file.

Figure 10:
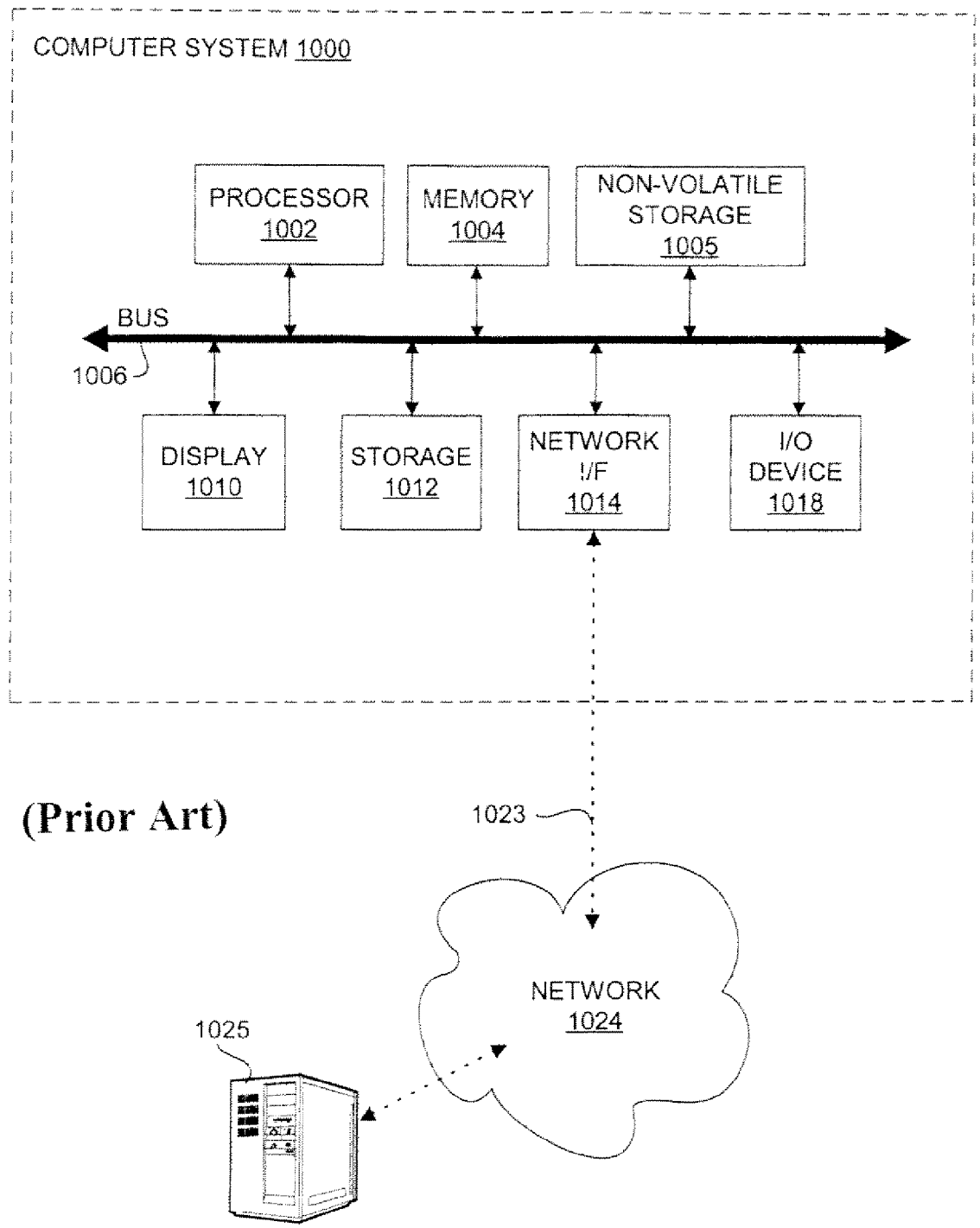
FIG. 10 is a block diagram illustrating one embodiment of an exemplary computer system in accordance with the teachings of the present invention.

FIG. 10 is an illustration of one embodiment of an example computer system 1000 on which embodiments of the present invention may be implemented. Computer system 1000 includes a processor 1002 coupled to a bus 1006. Memory 1004, storage 1012, non-volatile storage 1005, display 1010, input/output device 1018 and network interface 1014 are also coupled to bus 1006. Embodiments of computer system 1000 include, but are not limited to, a server, a desktop computer, a notebook computer, a personal digital assistant, a network workstation, or the like. A typical computer system will usually include at least processor 1002, memory 1004, and bus 1006 coupling memory 1004 to processor 1002.

The computer system 1000 may interface to external systems through the network interface 1014. Network interface 1014 may include, but is not limited to, a modem, a network interface card (NIC), a T-1 line interface, a T-3 line interface, a token ring interface, a satellite transmission interface, or other interfaces for coupling a computer system to other computer systems. A carrier wave signal 1023 is received/transmitted by network interface 1014. In the embodiment illustrated in FIG. 10, carrier wave signal 1023 is used to interface computer system 1000 with a network 1024, such as a local area network (LAN), a wide area network (WAN), or the Internet. In one embodiment, network 1024 is further coupled to a remote computer 1025 such that computer system 1000 and the remote computer 1025 may communicate over network 1024.

Processor 1002 may include, but is not limited to, an Intel Corporation x86, Pentium®, or Itanium® family processor, a Motorola family processor, or the like. In one embodiment, computer system 1000 may include multiple processors. Memory 1004 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display 1010 may include a cathode ray tube (CRT), a liquid crystal display (LCD), an active matrix display, or the like. Input/output device 1018 may include a keyboard, a mouse, a printer, a scanner, or the like.

The computer system 1000 also includes non-volatile storage 1005 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like. Storage 1012 includes, but is not limited to, a magnetic hard disk, a magnetic tape, an optical disk, or the like. It is appreciated that instructions executable by processor 1002 may reside in storage 1012, memory 1004, non-volatile storage 1005 or may be transmitted or received via network interface 1014.

For the purposes of the specification, a machine-accessible medium includes any mechanism that stores information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., a read only memory (ROM), a random access memory (RAM), a magnetic disk storage media, an optical storage media, a flash memory device, etc.).

It will be appreciated that in one embodiment, computer system 1000 may execute operating system software. For example, one embodiment of the present invention utilizes Microsoft Windows® as the operating system for computer system 1000. Other operating systems that may also be used with computer system 1000 include, but are not limited to, the Apple Macintosh operating system, the Linux operating system, the Microsoft Windows CE® operating system, the Unix operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
   identifying in a pre-boot environment a plurality of module-to-module interfaces from a plurality of firmware modules, wherein a module-to-module interface allows a first firmware module of the plurality of firmware modules to invoke a second firmware module of the plurality of firmware modules;
   identifying in the pre-boot environment a plurality of dependency expressions corresponding to the plurality of firmware modules, wherein each dependency expression of a firmware module describes the module-to-module interfaces needed for execution of the firmware module;
   evaluating in the pre-boot environment the dependency expressions to determine an optimized pre-boot dispatch order of the firmware modules;
   dispatching in the pre-boot environment the firmware modules in response to the determined pre-boot dispatch order; and
   providing pre-boot services to the dispatched firmware modules wherein the pre-boot services comprise temporary management of random access memory in the pre-boot environment.

2. The method of claim 1, further comprising computing a directed acycle graph (DAG) based on the plurality of dependency expressions and the plurality of module-to-module interfaces, the DAG to be used in sorting the plurality of firmware modules.

3. The method of claim 1 wherein the plurality of module-to-module interfaces have been provided by collecting metadata from each module-to-module interface of the plurality of module-to-module interfaces, the metadata describing the module-to-module interfaces produced by the firmware module.

4. The method of claim 1, further comprising generating an error if a firmware module of the plurality of firmware modules includes a dependency expression that refers to a module-to-module interface that is not produced by the plurality of firmware modules.

5. The method of claim 1 wherein the plurality of firmware modules comprise a plurality of Pre-EFI (Extensible Firmware Interface) Initialization Modules (PEIMs).

6. The method of claim 5 wherein the plurality of module-to-module interfaces comprise a plurality of PEIM-to-PEIM Interfaces (PPIs).

7. The method of claim 1, further comprising selecting bootstrap processors from a plurality of processors in the computer system in the pre-boot environment, wherein selecting the bootstrap processors comprises waiting for a selected the processors to provide a status report of the selected process within a waiting time.

8. The method of claim 7, wherein the firmware modules comprise drivers for components of the computer system that are to be executed by a yet-to-be-booted operating system.

9. The method of claim 7 wherein the firmware modules operate in accordance with an Extensible Firmware Interface (EFI) specification.

10. The method of claim 7, further comprising using an update utility to update the firmware modules.

11. An article of manufacture comprising:
    a machine-accessible medium including a plurality of instructions which when executed perform operations in a computer system comprising:
    entering a pre-boot environment;
    initializing in the pre-boot environment a Pre-EFI Initialization (PEI) foundation that includes a PEI Services Table that is accessible by PEI modules (P E N in the computer system, wherein each PEIM comprises a dependency expression, and wherein the PEJ, foundation comprises a PEIM dispatcher;
    using the PEI foundation to provide PEIM services to the PEIMs; and
    using the PEIM dispatcher to dispatch the PEIMs in accordance with the dependency expression of each PEIM.

12. The article of manufacture of claim 11 wherein the dependency expressions have been generated using a directed acycle graph (DAG) based on the dependency expressions and metadata.

13. The article of manufacture of claim 11 wherein execution of the plurality of instructions further perform operations of drivers for components of the computer system that are to be executed by a yet-to-be-booted operating system.

14. The article of manufacture of claim 11 wherein execution of the plurality of instructions further perform operations comprising generating an error signal if the module-to-module interface of a dependency expression is not described in metadata associated with each PEIM.

15. The article of manufacture of claim 11 wherein execution of the plurality of instructions further perform operations comprising removing metadata from each PEIM.

16. The article of manufacture of claim 11 wherein the PEIMs operate in accordance with an Extensible Firmware Interface (EFI) specification.

17. The article of manufacture of claim 11 wherein each PEIM includes PEIM-to-PEIM Interfaces (PPIs).

18. A computer system, comprising:

a processor; and a magnetic storage device operatively coupled to the processor, the magnetic storage device including instructions which when executed by the processor perform operations comprising:

collecting in a pre-boot environment a dependency expression from each of a plurality of firmware modules;

collecting metadata from each of the plurality of firmware modules, the metadata describing module-to-module interfaces produced by a firmware module of the plurality of firmware modules;

sorting the plurality of firmware modules into an optimized order based on the dependency expressions and the metadata; and dispatching in the pre-boot environment the plurality of firmware modules in the optimized order.

19. The computer system of claim 18, further comprising a second processor for dispatching the plurality of modules in the optimized order.

20. The computer system of claim 18, further comprising a network interface operatively coupled to the processor to receive at least one firmware module of the plurality of firmware modules.

21. The computer system of claim 18 wherein the plurality of firmware modules includes a plurality of Pre-EFI (Extensible Firmware Interface) Initialization Modules (PEIMs) and the module-to-module interfaces include PEIM-to-PEIM Interfaces (PPIs).

22. A system, comprising:

data stored in a machine-accessible medium stored to encode a set of firmware modules in a predetermined order, the predetermined order defined according to:

a dependency expression associated with each firmware module of the set of firmware modules; and metadata associated with each firmware module, the metadata describing module-to-module interfaces produced by each firmware module; and code stored in a machine-accessible medium which in a pre-boot environment executes the set of firmware modules according to the predetermined order.

23. The system of claim 22 wherein the data which encodes the set of firmware modules includes a firmware volume.

24. The system of claim 22 wherein the code is executed during a pre-boot phase of a computer system.

25. The system of claim 22 wherein the code which executes the set of firmware modules includes a PEI foundation module.

26. The system of claim 22 wherein the set of firmware modules includes a plurality of Pre-EFI (Extensible Firmware Interface) Initialization Modules (PEIMs) and the module-to-module interfaces include PEIM-to-PEIM Interfaces (PPIs).

27. The system of claim 22 wherein the data and the code comply with an Extensible Firmware Interface (EFI) specification.

* * * * *

UNITED STATES PATENT AND TRADEMARK OFFICE
CERTIFICATE OF CORRECTION

PATENT NO.        : 7,448,030 B2                                          Page 1 of 1
APPLICATION NO.   : 10/804405
DATED             : November 4, 2008
INVENTOR(S)       : Liu et al.

It is certified that error appears in the above-identified patent and that said Letters Patent is hereby corrected as shown below:

In column 10, claim 11 at line 54 delete, "(PEN" and insert --(PEIM)--.

In column 10, claim 11 at line 56 delete, "PEJ," and insert --PEI--.

Signed and Sealed this

Eighth Day of December, 2009

David J. Kappos
*Director of the United States Patent and Trademark Office*